Aug. 31, 1937.  W. R. FREEMAN  2,091,678
BRAKE CONTROL MECHANISM
Filed March 6, 1937  2 Sheets-Sheet 1

INVENTOR
W.R. FREEMAN
BY
ATTORNEY

Aug. 31, 1937.  W. R. FREEMAN  2,091,678
BRAKE CONTROL MECHANISM
Filed March 6, 1937  2 Sheets-Sheet 2
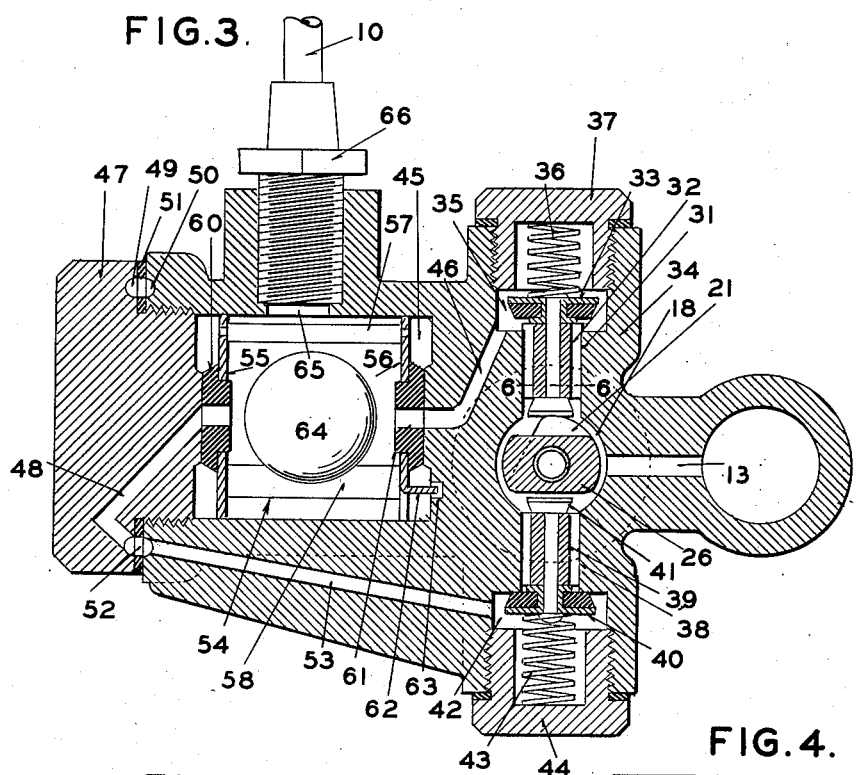
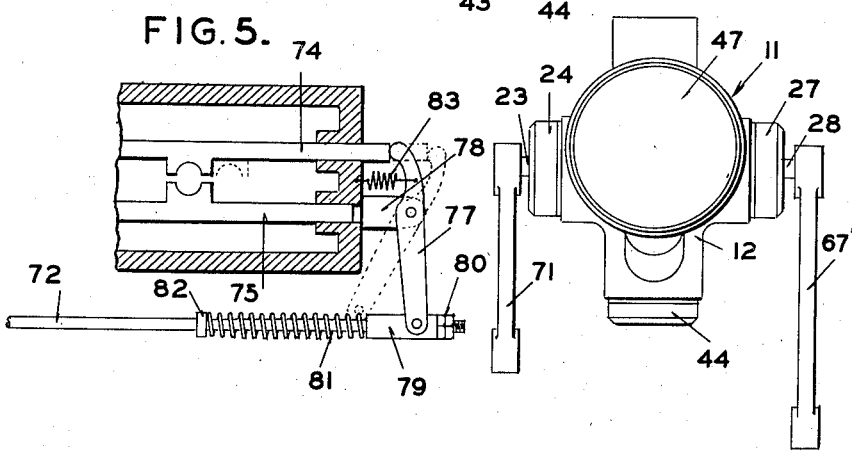
INVENTOR
W. R. FREEMAN
BY
ATTORNEY Patented Aug. 31, 1937

2,091,678

UNITED STATES PATENT OFFICE 2,091,678

BRAKE CONTROL MECHANISM

Walter R. Freeman, University City, Mo., assignor to Wagner Electric Corporation, St. Louis, Mo., a corporation of Delaware Application March 6, 1937, Serial No. 129,372

18 Claims. (Cl. 192—4)

My invention relates to control mechanism for a braking system and more particularly to improved means for holding the brakes in applied position under certain conditions.

One of the objects of my invention is to provide a vehicle braking mechanism with means which, when the vehicle clutch is disengaged, will prevent release of the brakes from applied position when the vehicle is facing downward on an inclined roadway and the change speed gearing is set in reverse gear position, and also when the vehicle is facing upward on an inclined roadway and the change speed gearing is set in another predetermined position or positions.

A more specific object of my invention is to provide an apparatus of the kind referred to which comprises two passages each capable of affording means of communication between the master cylinder and a wheel cylinder or cylinders of hydraulic braking apparatus and each of which is provided with two valves, one of the valves in each passage being controlled by gravity-actuated means and the other valves being under the control of the vehicle operator.

Figure 1:
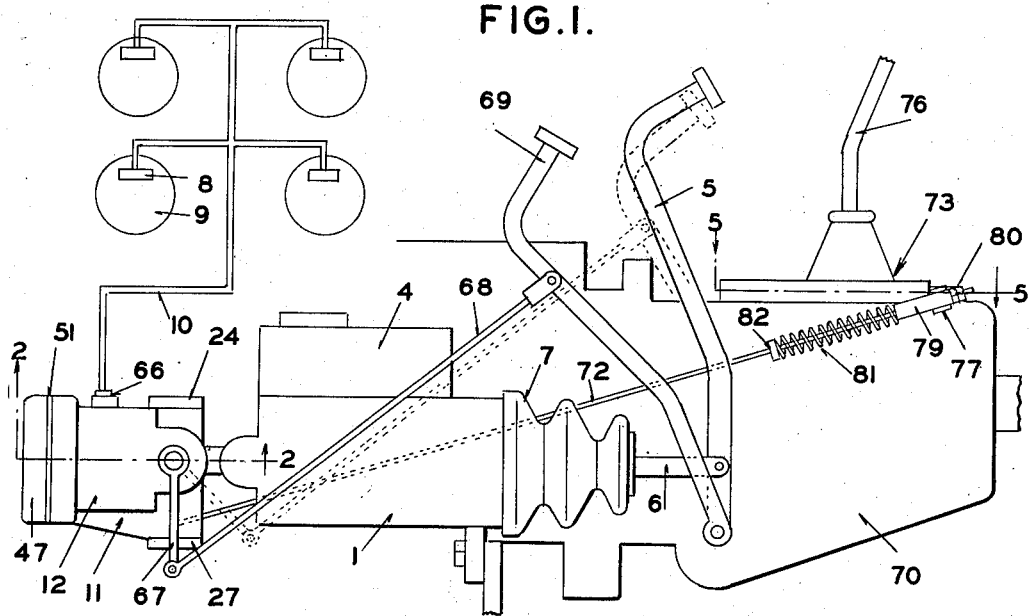
Figure 2:
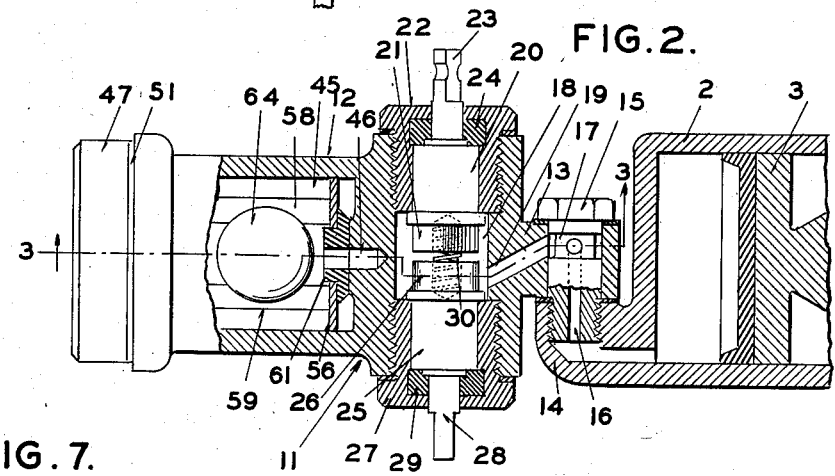
Figure 7:
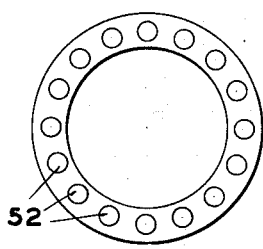
Figure 6:
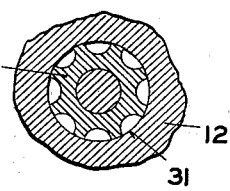

Other objects of my invention will become apparent from the following description taken in connection with the accompanying drawings in which Figure 1 is a view, partly in elevation and partly diagrammatic, showing a braking system, a portion of the clutch mechanism, and a portion of the change speed gearing with which is associated my improved brake holding means; Figure 2 is a cross sectional view through the portion of the apparatus embodying the fluid control valves and also shows a portion of the master cylinder of the braking system, the view being taken on the line 2—2 of Figure 1; Figure 3 is a cross sectional view taken on the line 3—3 of Figure 2; Figure 4 is an end view of the valve containing unit; Figure 5 is a cross sectional view taken on the line 5—5 of Figure 1, showing the change speed gearing control hook-up; Figure 6 is a cross sectional view on the line 6—6 of Figure 3; and Figure 7 is a view of the gasket between the end plug and the valve casing.

I have disclosed my invention as being embodied in a hydraulic brake actuating system but this is by way of example only as it can be embodied in other types of brake actuating mechanism.

Referring to the drawings in detail, the master cylinder device 1 of the hydraulic system is of the usual type comprising a cylinder 2, a piston 3, and a reservoir 4 communicating with the cylinder by a suitable port (not shown) when the piston is in its retracted position. The piston is adapted to be actuated by the brake pedal 5 and the piston rod 6 extending into the cylinder and abutting the piston, the cylinder end being enclosed by boot 7. The outlet of the master cylinder is in communication with the actuating motors 8 of the brake assemblies 9 by means of a conduit 10 (the brake assemblies and the fluid motor being diagrammatically shown). My improved valve means for holding the brakes in applied position under certain conditions is designated generally by the reference character 11 and this valve means is interposed between the end of the master cylinder and the conduit 10 leading to the brake actuating motors.

The valve casing 12 is provided with a projecting portion 13 which is secured to an extended end 14 of the cylinder 2 by means of a stud bolt 15. This stud bolt is formed with a central passage 16 which is in communication with an annular groove 17 in the body portion of the bolt whereby the chamber 18 in the valve casing will be in communication with the cylinder 2 through the passage 19.

The chamber 18 in the valve casing is formed by a bore extending through the casing and in one side thereof is a shaft 20 carrying a triangular-shaped cam 21 positioned in the chamber. The shaft is supported by a closure plug 22 through which the outer reduced end 23 of the shaft projects. A suitable packing washer 24 is inserted between the plug and the end of the shaft to prevent leakage of fluid. A second shaft 25 is in axial alignment with shaft 20 and carries on its inner end within the chamber a rectangular-shaped cam 26 spaced slightly from the triangular cam 21. Shaft 25 is also supported by a closure plug 27 and the outer end 28 thereof extends through this plug. A packing washer 29 is employed to prevent leakage past the shaft. Also, in order to assist in maintaining the sealing washers of both shafts in tight engagement with the shafts and closure plugs, a coil spring 30 is positioned in suitable recesses in the ends of the shaft, thus biasing the shafts toward their respective packing washers.

Extending upwardly from chamber 18 at a point substantially above the rectangular cam 21 is a bore 31 in which is slidably positioned a fluted valve stem 32 (see Figure 6) carrying a valve 33 at its upper end, the lower end of the valve stem being provided with a suitable head 34 for cooperation with the triangular cam 21. The valve 33 is positioned within a chamber 35 and is biased toward its seat by a spring 36 interposed between the valve and the closure plug 37.

Extending downwardly from chamber 18 at a point substantially below the rectangular cam 26 is another bore 38 in which is slidably positioned a fluted valve stem 39 carrying a valve 40 at its lower end, the upper end being provided with a suitable head 41 for cooperation with cam 26. The valve 40 is positioned within chamber 42 and is biased toward its seat by a spring 43 interposed between the valve and the closure plug 44.

The forward portion of the valve casing is formed with a cylindrical chamber 45, the rear end of which is in communication with the valve chamber 35 by means of a passage 46. The forward end of this cylindrical chamber is closed by a plug 47, the plug having an angularly positioned passage 48 therein which is in communication with the forward end of chamber 45. This passage 48 also communicates with an annular groove 49 in the face of the shoulder of the plug and the end face of the portion of the casing which forms the cylindrical chamber 45 is also provided with an annular groove 50 opposed to annular groove 49 in the plug. An annular gasket 51 is positioned between the plug shoulder and the end surface of the casing, and in order to insure that the two grooves 49 and 50 are in constant communication when the plug is screwed home, this gasket is provided with a plurality of holes 52. A passage 53 in the casing wall has one end in communication with annular groove 50 and the other end in communication with valve chamber 42.

Within the chamber 45 is a cage member 54 formed of end plates 55 and 56 and three interconnecting rods 57, 58 and 59. The end plates are provided with annular rubber valve seats 60 and 61 which are in fluid-tight engagement with the surface of the plug surrounding the inner end of passage 48 and the end surface of the cylinder surrounding the end of passage 46 leading to valve chamber 35, respectively. The cage is prevented from rotation by means of a bent portion 62 of end plate 56, this bent portion projecting into a recess 63 in the end wall of the cylindrical chamber. The two lower connecting rods 58 and 59 of the cage are so spaced as to form a track upon which is mounted a ball 64, the ball being so positioned by the track that it will cooperate with one of the rubber seats when at one end of the track and with the other rubber seat when at the other end of the track. The chamber 45 is also provided with a suitable outlet 65 which is connected to conduit 10 leading to the brakes, the connection being accomplished by a screw-threaded fitting 66.

As indicated in Figure 4, the outer end portion 28 of shaft 25 has secured thereto an arm 67 which is connected by means of a rod 68 to the usual clutch pedal 69 pivotally mounted adjacent the brake pedal 5 and controlling the usual vehicle clutch mechanism mounted between the engine of the vehicle and the change speed gearing enclosed within the gearing housing 70. The outer end 23 of shaft 20 has secured thereto an arm 71 which is connected to rod 72 extending to a point adjacent the rear end of the shifting mechanism 73 of the change speed gearing. This shifting mechanism of the gearing comprises shifting rods 74 and 75 selectively controlled by the gear shifting lever 76. The gear shifting rod 74 controls the "low" and reverse speed gears, the low speed gears being rendered operative by a forward movement of the rod from its neutral position and the reverse speed gears being rendered operative by a rearward movement of the rod, as indicated by the dotted lines in Figure 5. The rod 75 controls the "second" and "high" speed gears of the gearing, the rearward movement of the rod causing the second speed gears to be operative and the forward movement of the rod causing the direct connection for the high speed to be operative. The rod 74 is of such length as to extend through the rear end of the casing which supports the rods and engages one end of a lever 77 pivoted on a suitable support 78 secured to the housing. The other end of lever 77 is pivotally connected to a sleeve 79 slidably mounted on the end of the connecting rod 72 leading from arm 71. This sleeve is normally biased against nuts 80 on the end of the rod by means of a coil spring 81 interposed between said sleeve and collar 82 on the rod. A suitable spring 83 is also provided to normally bias the inner end of the lever into engagement with the end of shifting rod 74.

The valve casing 12, when secured to the end of cylinder 2, is so positioned that the track formed by rods 58 and 59 is longitudinally disposed with respect to the vehicle and in a horizontal position when the vehicle is on a horizontal roadway or, in other words, the track is positioned parallel to the surface of the roadway upon which the vehicle is resting. When the change speed gearing is in either neutral or in one of its forward speed positions, the connection between the gear shifting mechanism and the shaft 20 will be in the position shown in full lines in Figures 1 and 5. Under these conditions the triangular cam 21 controlled by shaft 20 will be as shown in Figure 3 wherein valve 33 will be unseated. If the clutch pedal is disengaged, as shown in full lines in Figure 1, the rectangular cam 26, controlled by shaft 25 connected to the clutch pedal, will be as shown in Figure 3. If the vehicle is stopped under these conditions and is inclined upwardly in a lengthwise direction, that is, facing upwardly on an inclined roadway, the ball 64 will be seated against annular rubber seat 61. If the brakes have been applied, the fluid under pressure in the braking system will be held under pressure since ball 64 will prevent the fluid from flowing back to the master cylinder by way of passage 46, valve chamber 35, bore 31, chamber 18, and passage 13. It is also impossible for fluid to flow back to the master cylinder through passages 48 and 53 due to the fact that valve 42 is in closed position. If the brakes have not been applied, they may be applied and held in this position by moving the brake pedal, thus causing ball 64 to be unseated sufficiently to allow fluid to flow into the brake lines. With the brakes held applied, it is not necessary to hold the foot on the brake pedal thus permitting its use on other instruments, as for example, the accelerator pedal. It is, therefore, seen that as long as the clutch pedal is maintained in a depressed position, the brakes will be held applied and the vehicle will be prevented from rolling backward on an inclined roadway. If it is desired to start the vehicle by the usual acceleration of the engine and engagement of the clutch mechanism, the return movement of the clutch pedal will cause the rectangular cam 26 to be rotated, thereby unseating valve 40 and permitting fluid to return from the brake system to the master cylinder by way of passages 48 and 53, valve chamber 42, chamber 18, and passage 13.

If, for example, the vehicle is facing upward on an incline and the brakes are held in applied position and it is decided to move the vehicle rearwardly, the change speed gearing will be placed in reverse gear. This operation moves shifting rod 74 rearwardly and causes lever 77 to be rotated to the dotted line position shown in Figure 5. This movement of the lever is sufficient to rotate triangular cam 21 approximately sixty degrees, thus permitting valve 33 to close and open valve 40. With the ball seated against annular rubber seat 61, fluid will be free to flow through passages 48 and 53, valve chamber 42, and passage 38 to the master cylinder and the brakes cannot be maintained in applied position unless the foot of the operator continues to maintain pressure on the brake pedal. The vehicle will now be free to move backward by releasing the brake pedal. It is thus seen that under these conditions if it is desired to back the vehicle down an incline, as for example, from a garage or into a parking place, the vehicle can be controlled solely by the application and release of the brakes through the brake pedal and the holding valve will be ineffective in the same manner as if it were not embodied in the braking system.

When the vehicle is stopped and inclined downwardly in a lengthwise direction, that is, facing downwardly on an inclined roadway and it is desired to back the vehicle up the incline without rolling forward, the valve means will be effective to hold the brakes applied without pressure on the brake pedal, thus permitting the right foot of the operator to be employed to actuate the accelerator. As already stated, the placing of the gearing in reverse causes the triangular cam 21 to be moved so that valve 33 will be closed and valve 40 opened. Since the vehicle is facing downwardly on an incline, ball 64 will engage rubber seat 60, thus closing off passage 48. It is also impossible for fluid from the braking system to flow back by way of passage 46, valve chamber 35, and bore 31 due to the closed condition of valve 33. If the brakes are already applied, they will be so maintained. If they are not already applied, they may be applied by proper manipulation of the master cylinder. This will cause fluid to unseat ball 64 and permit fluid to flow into the brake lines. Now when the engine is connected to the propeller shaft of the vehicle by engagement of the clutch, the brakes will be released at the proper time by cam 26, thus permitting the vehicle to move backward up an incline under the power of the engine and without the brakes applied. If the transmission is not placed in reverse position then the triangular cam 21 will be in a position to hold valve 33 open and, consequently, since the ball is against seat 60, the holding means will not be effective as fluid may flow to and from the brake lines from the master cylinder by way of passage 46, chamber 35, and bore 31.

When the vehicle is travelling along a highway and the clutch mechanism is held in disengaged position and the brakes are applied, they cannot be held in applied position due to the fact that the action of inertia during deceleration of the vehicle will hold ball 64 against seat 60 and thus not obstruct passage 46. The brakes will then be under the direct action of the foot of the operator on the brake pedal and may be released and applied at will.

From the foregoing description of my improved brake valve holding means, it is readily seen that it so functions as to be operative or inoperative as desired without the necessity of the operator doing any thinking to bring about the proper operation. When the change speed gearing is in neutral, or a forward speed position, it is only desirable to have the brakes held applied and the vehicle held from rolling when it is stopped and facing upward on an incline, as for example, at a traffic intersection or a railroad crossing grade. The valve means and its control means so function as to meet these requirements. It is also not desirable, when the vehicle is moving on a highway, to have the brakes controlled in any way except by the movement of the brake pedal. This desired operation is taken care of by the improved valve, as ball 64 will always be held in a forward position by the action of inertia during deceleration of the vehicle. It is also desirable to be able to hold the vehicle in stopped position without pressure on the brake pedal when the vehicle is facing downward on an incline and preparatory to driving it backward up an incline. The valve means is effective under these conditions as the change speed gearing is placed in reverse position and the ball is in its forward position against seat 60. In the proper operation of the vehicle it is also not desirable to have the holding means effective when the vehicle is being backed down an incline. The improved valve fulfills this condition since it is inoperative when the change speed gearing is in reverse. It is to be noted that the valve holding means is always caused to be ineffective when the clutch is in engaged position and if the valve holding means is effective while the clutch is disengaged, it will immediately be made ineffective at the time the clutch is engaged, thus permitting the vehicle to be moved in the desired direction.

Being aware of the possibilities of modifications in the particular structure herein described, without departing from the fundamental principles of my invention, I do not intend that its scope be limited except as set forth by the appended claims.

Having fully described my invention, what I claim as new and desire to secure by Letters Patent of the United States is:

1. In vehicle braking mechanism, a fluid-actuated brake unit, a source of fluid pressure connected to said unit, the connecting means embodying two passages through either of which fluid may be transmitted, two valves for each passage for preventing return flow of fluid therethrough, means responsive to longitudinal inclination of the vehicle for controlling one of the valves in each of said passages, and means under control of the vehicle operator for controlling the other valves.

2. In vehicle braking mechanism, a fluid-actuated brake unit, a source of fluid pressure connected to said unit, the connecting means embodying two passages through either of which fluid may be transmitted, two valves for each passage for preventing return flow of fluid therethrough, gravity-actuated means for controlling one of the valves in each of said passages, and means under control of the vehicle operator for controlling the other valves.

3. In vehicle braking mechanism, a fluid-actuated brake unit, a source of fluid pressure connected to said unit, the connecting means embodying two passages through either of which fluid may be transmitted, two valves for each passage for preventing return flow of fluid therethrough, a ball capable of assuming either of two operative positions depending upon downward or upward inclination of the vehicle, said ball functioning to close a valve in one passage when in one of its operative positions and to close a valve in the other passage when in its other operative position, and means under control of the vehicle operator for controlling the other valves.

4. In vehicle braking mechanism, a fluid-actuated brake unit, a source of fluid pressure connected to said unit, the connecting means embodying two passages through either of which fluid may be transmitted, two valves for each passage for preventing return flow of fluid therethrough, means under control of the vehicle operator for controlling one of the valves in each of said passages, and means for determining that the second valve in one of the passages will be open when the second valve in the other passage is closed.

5. In a vehicle provided with a change speed gearing, a fluid-actuated brake unit and a source of fluid pressure connected to said unit, the connecting means embodying two passages through either of which fluid may be transmitted, two valves for each passage for preventing return flow of fluid therethrough, means effective when the gears are in reverse to maintain a valve in one of the passages in open position and effective when the gears are in another relation to maintain a valve in the other passage in open position, and means for determining that the second valve in one of the passages will be open when the second valve in the other passage is closed.

6. In a vehicle provided with a change speed transmission, a clutch mechanism, a fluid-actuated brake unit and a source of fluid pressure connected to said unit, the connecting means embodying two passages through either of which fluid may be transmitted, two valves for each passage for preventing return flow of fluid therethrough, means effective when the gears are in reverse to maintain a valve in one of the passages in open position and effective when the gears are in another relation to maintain a valve in the other passage in open position, means operable by the clutch mechanism and functioning when the clutch is in clutch-engaged position to cause both of said last named valves to be open, and means for determining that the second valve in one of the passages will be open when the second valve in the other passage is closed.

7. In a vehicle provided with a change speed gearing, a fluid-actuated brake unit and a source of fluid pressure connected to said unit, the connecting means embodying two passages through either of which fluid may be transmitted, two valves for each passage for preventing return flow of fluid therethrough, means responsive to longitudinal inclination of the vehicle for controlling one of the valves in each of said passages, and connections whereby when the gearing is set in reverse the second valve in one of the passages will be open and when the gearing is set in another position the second valve in the other passage will be open.

8. In a vehicle provided with a change speed gearing, a clutch mechanism, a fluid-actuated brake unit and a source of fluid pressure connected to said unit, the connecting means embodying two passages through either of which fluid may be transmitted, two valves for each passage for preventing return flow of fluid therethrough, means responsive to longitudinal inclination of the vehicle for controlling one of the valves in each of said passages, connections whereby when the gearing is set in reverse the second valve in one of the passages will be open and when the gearing is set in another position the second valve in the other passage will be open, and means operable when the clutch mechanism is in clutch-engaged position for causing both of said second valves to be open.

9. In a vehicle provided with a change speed gearing, a fluid-actuated brake unit and a source of fluid pressure connected to said unit, the connecting means embodying two passages through either of which fluid may be transmitted, two valves for each passage for preventing return flow of fluid therethrough, a ball capable of assuming either of two operative positions depending upon downward or upward inclination of the vehicle, said ball functioning to close a valve in one passage when in one of its operative positions and to close a valve in the other passage when in its other operative position, and connections whereby when the gearing is set in reverse the second valve in one of the passages will be open and when the gearing is set in another position the second valve in the other passage will be open.

10. In a vehicle provided with a change speed gearing, a clutch mechanism, a fluid-actuated brake unit and a source of fluid pressure connected to said unit, the connecting means embodying two passages through either of which fluid may be transmitted, two valves for each passage for preventing return flow of fluid therethrough, a ball capable of assuming either of two operative positions depending upon downward or upward inclination of the vehicle, said ball functioning to close a valve in one passage when in one of its operative positions and to close a valve in the other passage when in its other operative position, connections whereby when the gearing is set in reverse the second valve in one of the passages will be open and when the gearing is set in another position the second valve in the other passage will be open, and connections whereby when the clutch mechanism is in clutch-engaged position both of said second valves will be open.

11. In vehicle braking mechanism, a fluid-actuated brake unit, a source of fluid pressure connected to said unit, and means for preventing release of the brakes and comprising a unitary structure interposed in the connection between the source of fluid pressure and the brake unit, said structure embodying a casing having two passages therein, two valve seats for said passages facing each other, a rolling ball interposed between the seats and capable of cooperating with either of said seats depending upon the upward or downward inclination of the vehicle, a second valve for each of said passages, and a cam actuated by the vehicle operator for causing the second named valves to be selectively opened.

12. In a vehicle provided with a change speed gearing, a fluid-actuated brake unit and a source of fluid pressure connected to said unit, means for preventing release of the brakes and comprising a unitary structure interposed in the connection between the source of fluid pressure and the brake unit, said structure embodying a casing having two passages therein, two valve seats for said passages facing each other, a rolling ball interposed between the seats and capable of cooperating with either of said seats depending upon the upward or downward inclination of the vehicle, a second valve for each of said passages, a cam for controlling said last named valves, and connections between the change speed gearing and the cam to cause one of said valves to be open when the gearing is in reverse and the other of said valves to be open when the gearing is in either neutral or a forward gear.

13. In a vehicle provided with a change speed gearing, a clutch mechanism, a fluid-actuated brake unit and a source of fluid pressure connected to said unit, means for preventing release of the brakes and comprising a unitary structure interposed in the connection between the source of fluid pressure and the brake unit, said structure embodying a casing having two passages therein, two valve seats for said passages facing each other, a rolling ball interposed between the seats and capable of cooperating with either of said seats depending upon the upward or downward inclination of the vehicle, a second valve for each of said passages, a cam for controlling said last named valves, connections between the change speed gearing and the cam to cause one of said second named valves to be open when the gearing is in reverse and the other of said second named valves to be open when the gearing is in either neutral or a forward gear, and a second cam operable by the clutch mechanism and functioning when the clutch is engaged to cause both of said second named valves to be open.

14. In a vehicle provided with a braking mechanism, a clutch mechanism and a change speed gearing, means for preventing release of the brakes from an applied position, means operable when the gears of the change speed gearing are in reverse to cause said release preventing means to be effective to prevent release of the brakes when the vehicle is facing downward on an inclined roadway and ineffective to prevent release of the brakes when the vehicle is facing upward on an inclined roadway, means operable when the gears of the gearing are in another position to cause the release preventing means to be effective when the vehicle is facing upward on an inclined roadway and ineffective when facing downward on an inclined roadway, and means operable by the clutch mechanism and functioning when in clutch-engaged position to cause said release preventing means to be ineffective.

15. In a motor vehicle provided with a braking mechanism and a change speed gearing, gravity-controlled means associated with the braking mechanism for holding the brakes in an applied position, and means controlled by the setting of the change speed gearing to cause said gravity-controlled means to be effective to hold the brakes in an applied position and prevent the vehicle from moving by its own weight on an inclined roadway and in a direction opposite to that for which the change speed gearing is set.

16. In a motor vehicle provided with a braking mechanism, a clutch mechanism and a change speed gearing, gravity-controlled means associated with the braking mechanism for holding the brakes in an applied position, means controlled by the setting of the change speed gearing to cause said gravity-controlled means to be effective to hold the brakes in an applied position and prevent the vehicle from moving by its own weight on an inclined roadway and in a direction opposite that for which the change speed gearing is set, and means operable when the clutch mechanism is in clutch-engaged position for causing the holding means to be ineffective.

17. In a vehicle provided with a change speed gearing, a braking mechanism, and means associated with said braking mechanism for preventing release of the brakes from an applied position when the vehicle is facing downward on an inclined roadway and the gearing is in reverse gear and when the vehicle is facing upward on an inclined roadway and the gearing is in another position, said means embodying a rolling ball movable to a forward position when the vehicle is facing downward on an inclined roadway to thereby govern the operation of said means when the gearing is in reverse gear and movable to a rearward position when the vehicle is facing upward on an inclined roadway to thereby govern the operation of said means when the gearing is in the other position.

18. In a vehicle provided with a change speed gearing and a braking mechanism, means associated with said braking mechanism for preventing release of the brakes from an applied position when the vehicle is facing downward on an inclined roadway and the gearing is in reverse gear and when the vehicle is facing upward on an inclined roadway and the gearing is in another position, said means embodying a rolling ball movable to a forward position when the vehicle is facing downward on an incline to thereby govern the operation of said means when the gearing is in reverse gear and movable to a rearward position when the vehicle is facing upward on an inclined roadway to thereby govern the operation of said means when the gearing is in the other position, and manually-controlled means operable independently of the gearing to cause said release preventing means to be ineffective.

WALTER R. FREEMAN.